April 1, 1969

L. SUVERKROP 3,435,950

MATERIALS SEPARATION DEVICES

Filed March 3, 1966

INVENTOR
LEW SUVERKROP, DECEASED,
BY BETH SUVERKROP ADMINISTRATRIX.

ATTORNEY

April 1, 1969 — L. SUVERKROP — 3,435,950
MATERIALS SEPARATION DEVICES
Filed March 3, 1966

INVENTOR
LEW SUVERKROP, DECEASED
BY BETH SUVERKROP, ADMINISTRATRIX
ATTORNEY

April 1, 1969     L. SUVERKROP     3,435,950

MATERIALS SEPARATION DEVICES

Filed March 3, 1966     Sheet 3 of 5

INVENTOR
LEW SUVERKROP, DECEASED,
BY BETH SUVERKROP, ADMINISTRATRIX.

ATTORNEY

April 1, 1969　　　　L. SUVERKROP　　　　3,435,950
MATERIALS SEPARATION DEVICES

Filed March 3, 1966　　　　　　　　　　　　Sheet 4 of 5

INVENTOR
LEW SUVERKROP, DECEASED,
BY BETH SUVERKROP, ADMINISTRATRIX.

ATTORNEY

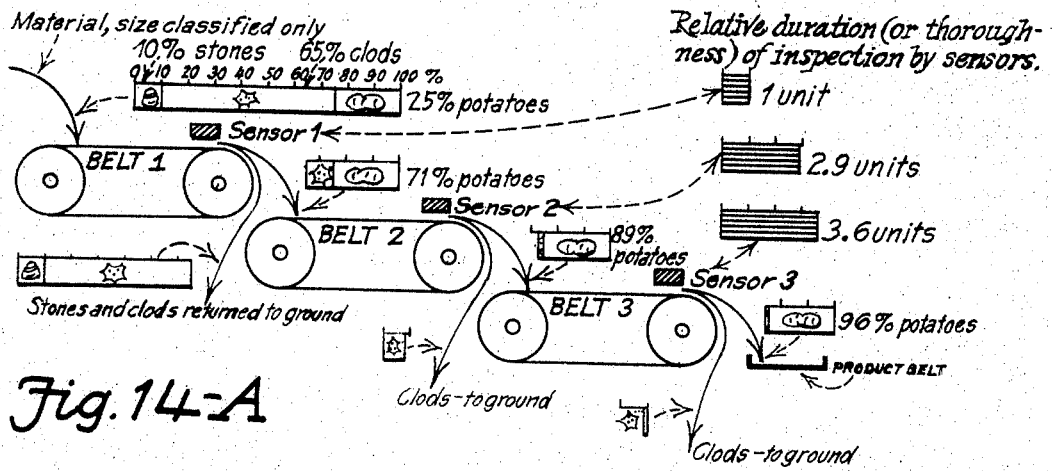
Fig. 14-A
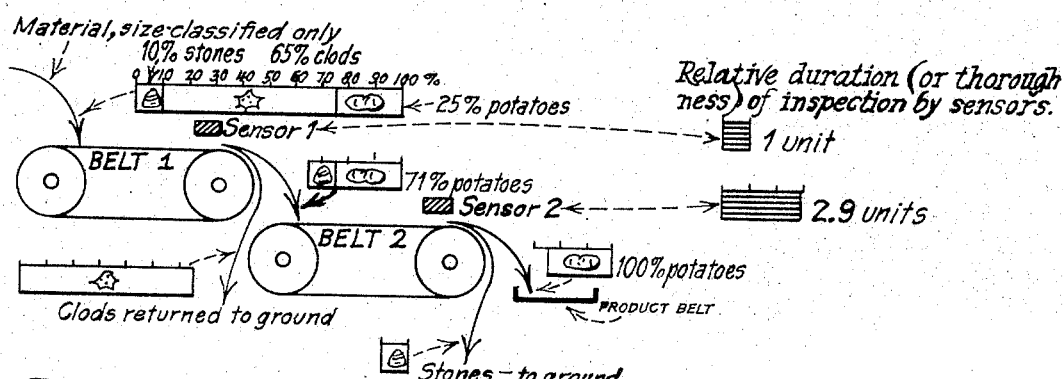
Fig. 14-B
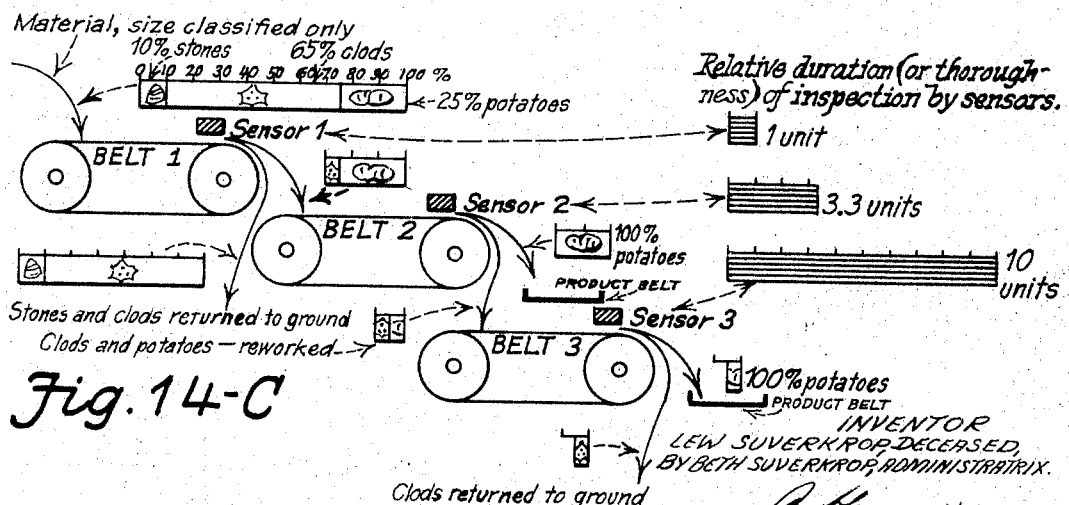
Fig. 14-C

United States Patent Office 3,435,950
Patented Apr. 1, 1969

3,435,950
MATERIALS SEPARATION DEVICES
Lew Suverkrop, deceased, late of Bakersfield, Calif., by Beth Suverkrop, executrix, 109 H St., Bakersfield, Calif. 93304
Filed Mar. 3, 1966, Ser. No. 536,174
Int. Cl. B07c 9/00, 5/34
U.S. Cl. 209—73                                         20 Claims

ABSTRACT OF THE DISCLOSURE

Crop handling mechanism operable to receive a mixture of crop product material and undesired waste objects mixed therewith and having different physical characteristics than the product material, the mechanism including means to separate the crop product material from the undesired waste objects by the use of guide means to direct the movement of a mixture of desired crop product material and undesired material along a predetermined and substantially fixed path, means to engage and remove from the guide means material larger than a predetermined size to be processed by the mechanism, separating means movable relative to the guide means and operable to change the direction of movement of one of said materials separated from the other material, and a plurality of embodiments of sensor control means positioned adjacent said path and responsive to at least one physical characteristic of one of the materials when moved therepast and operable selectively to actuate said separating means in response to differences respectively in the reaction of said physical characteristics of said desired crop material and undesired objects and materials relative to the sensor control means and thereby cause the separating means to separate the desired crop product materials from the undesired objects or materials.

---

This invention is an improvement in materials separation equipment and methods, particularly of the kinds used in agriculture. There is great need and use for it in agricultural machines of the harvester type employed especially in the harvesting of root-type crops, and for this reason, this specification primarily is directed toward its application to such equipment and machines. The general purpose of this invention is to increase rapid and economical effectiveness in the commercial preparation for the market of root crops such as potatoes, onions, carrots and the like. Present harvesters make a primitive effort in that direction in a process that is based on screening and on the physical quality of friability, i.e., the relative ease with which a material may be crumbled.

Potatoes and similar crops are not friable but dirt clods usually are. Accordingly, existing harvesters agitate the potato-containing soil and break down most of it to particles smaller than a commercial potato. These smaller particles are then intended to fall through a moving screen upon which the product, including the potatoes, is carried and separately discharged. The process of these harvesters would, in general, be quite successful, and make a relatively clean separation to produce a product containing only potatoes, if all the soil handled by it were easily friable and contained no stones. This condition rarely, if ever, exists. Consequently, the product usually is a mixture of vegetable product plus stones and dirt clods that resist disintegration even by agitation that would ruinously bruise potatoes. Thus, hand picking is commonly applied to this mixed product in order to reduce the amount of soil hauled from the field with the potatoes.

Consequently, the first objective of this invention is to eliminate this costly and unreliable hand picking by providing automatic inspection of the individual particles comprising the above-mentioned mixed product, and the mechanized separation of desired crop products from it. The accomplishment of this is based on physical qualities other than friability, although this property is made use of as far as appropriate. To do this successfully depends partly on the suitable preparation of the mixed product, based partly on friability, in which present harvesters are not fully effective. They are not, even within their present limited scope confined to the basis of friability; that is, they are subject to improvement even apart from making use of any other physical quality.

In general, recent harvesters either (1) apply agitation equally to large and small clods, or (2), what is worse, they apply more agitation to the small clods than to the larger ones. This is the reverse of what is wanted or needed. The result is that large clods, some of them containing potatoes or other crop products, are discarded due to insufficient agitation, and excess agitation of the smaller particles, which include crop products such as potatoes, may result in excessive bruising. Thus, a further objective of the present invention is the correction of these inadequacies in the disintegration and rejection of dirt clods of crop size and larger, in present harvesters based on the physical quality of friability.

An additional objective is the more effective separation of stems and vine material from the product of potato harvesters and the like.

In these objectives just mentioned, the present invention more extensively heeds the physical characteristics such as friability to which present harvesters are limited. This invention is still wider in its scope. It takes into account, additionally, other physical matters, such as sound and friction, entirely disregarded in present harvesters. By making use of them, it affords quick and fine discrimination between crop products and stones or dirt clods, and makes a clean separation of crop products from the conglomeration that constitutes the product of present harvesters. In the resulting cleaner field separation, a greater percentage of the soil is returned directly to the ground than has been possible hitherto. While especially adapted to field use, the equipment comprising the present invention may also be employed otherwise, for example, such as in a packing shed or the like.

Importantly, the value of this soil is qualitative as well as quantitative; and because of both of these factors, the soil of the field should not be hauled off perennially with its crops. Ultimately the soil will have to be replaced or the fields will no longer produce; and long before then, their productivity will seriously decline. By leaving in the field what there is of the essential soil, we eliminate the plurally costly and useless haulage of dirt and stones that become troublesome refuse in the packing shed where the potatoes are finally cleaned and prepared for the market. By reducing this burden of refuse, costs in the packing shed operation are reduced, and there is an increase in its quality-effectiveness or its efficiency, or both of these.

In addition to the objectives indicated in the foregoing, a still further objective of this invention is to achieve the cleaner field separation while at the same time reducing bruise-damage to the crop products, thereby improving product quality.

To achieve efficient separation of the desired crop product from waste material and objects, it is another important object of the invention to utilize sensor control means and move the conglomerate of desired and waste material past the same in a substantially predetermined path or plurality of parallel paths, whereby the sensor control means can react effectively to certain physical characteristics of the material, either desired or waste, the sensor control means being interconnected to appropriate separating means which functions to deflect or by-pass preferably the waste material and discharge it from the handling mechanism comprising the invention, while the desired crop material passes to suitable receiving means.

Still another object of the invention is to utilize a series of sensor control means, in succession or otherwise, each sensitive or reactive to a different physical characteristic of the material moved past the same in succession, and each operative to control additional separating means so as to separate and discard waste material from the desired crop material as the same passes said sensor control means in succession and is acted upon by said successive separating means, thereby insuring maximum uniformity of a crop product free from waste material.

Moreover, to simplify the following description of the invention, it is directed particularly to potato harvesting, but it is to be understood at the outset that this is solely for convenience and it is to be understood that the invention is similarly useful for, and its objectives and purposes extend to the harvesting and separation of other agricultural products such as onions, carrots, beets and the like, from waste material associated therewith as removed from the ground in which they grew. Parts of the invention and particularly the sensor control means which provide its unique and useful discriminative abilities in classifying are such that they are responsive to either organic or inorganic materials having physical qualities that lend them to its application.

All these and other objectives of this invention will be apparent to those familiar with the problems of the various pertinent arts and with the methods and equipment used in solving such problems, from the description of this specification and from the accompanying illustrations, in which:

FIG. 14A is a diagram illustrating the effect of a series of three sensor control units upon material passed thereby in succession.

FIG. 14B is a diagram illustrating the effect of a series of two sensor control units responsive to different physical characteristics of the material passed thereby in succession.

FIG. 14C is a diagram illustrating the effect of a series of three sensor control units, each responsive to different physical characteristics of the material passed thereby in succession.

Figure 1:
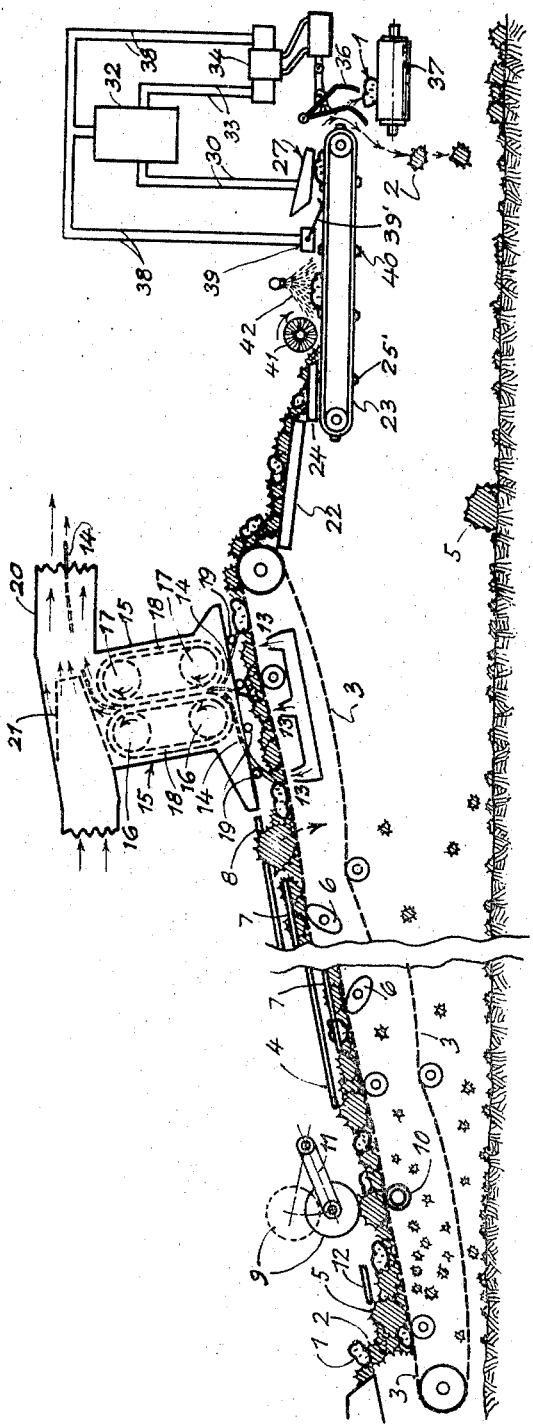
FIG. 1 is an elevation showing in exemplary and diagrammatical manner an arrangement of cooperating elements embodying this invention as applied to a harvester.

With a view to clarity, I have avoided cluttering the drawings with details common in potato harvesters such as running and steering gear and wheels, chassis, power units, and framework, together with the ordinary means used to connect and support operating elements on such harvesters. The details and application of these things are already well known and understood by mechanics and others familiar with the art.

In mechanical potato harvesting it is common practice first to remove vines and the like, and waste vegetable material that otherwise interferes with the operation. Excepting for mechanical means on the harvester to accomplish such removal, these machines generally have at their most forward end a spade-like blade or scoop which slopes downwardly and forwardly and digs beneath the potatoes growing in the soil. As the harvester travels along over the field, forward motion of the scoop brings about the initial disintegration of the soil and the loosening of potatoes from it. As movement continues, the disintegrating mass of soil and contained potatoes is caused to crowd and slide up the inclined scoop to a height whence it is discharged onto a following conveyor belt.

This conveyor belt usually is also inclined upward and continues the movement of the conglomerate material mixture toward the rear of the harvester. Generally, the belt is constructed of links made of round steel cross rods having ends each bent and fashioned to surround and pivot on the straight part of the adjacent rod. The purpose of the belt is not only to elevate, but also to further the disintegration of the soil and bring about a separation of the potatoes from it. The space between adjacent cross rods is normally small enough that potatoes of commercial size remain upon and are carried along by the conveyor while anything smaller falls through to the ground. This discharge includes undersize potatoes as well as small stones and clods of dirt, with the still smaller particles of soil. Obviously, the conveyor carries the larger stones and clods along with the potatoes.

There are presently some potatoe harvesters available that screen out and reject the oversize clods that measure greater than maximum commercial potato size. Of these, one type has a following second belt upon which the first belt, just described, discharges. The mesh of this second belt is larger than in the first one; it is such that everything over commercial potato size will be carried and discharged to the ground at the rearward end of the harvester. Particles discharged from the first belt which are not oversize pass through the larger meshes of the second belt and are disposed of separately.

In another available type, the large-mesh second belt entirely encircles the small-mesh belt and, in its upward inclined part, it overlies and is parallel to the first belt. The large-mesh belt receives the material from the scoop of the harvester, and particles not oversize drop through it to the small-mesh belt. In this second type some effort is commonly made to disintegrate the large clods on the overlying belt. This affords this type some advantage over the first type because of the possibility that some oversize clods may contain potatoes. However, the great mass (weight) of each oversize clod usually causes the large-mesh belt to sag crosswise toward the flexible center of the cross-rods. Thus the material tends to gather in the middle of the belt where the usual clod disintegrating means is least effective. Consequently with either of these types, ineffectual disintegration of oversize clods results in loss of some potatoes.

Reverting to the main conveyor belt, this is commonly driven by toothed sprockets about which it turns at the ends of its extent along the harvester, as indicated in FIG. 1. Usually means are provided for vibrating the belt in the region between the supporting end sprockets. The primary purpose of vibrating is to disintegrate the dirt clods and free the potatoes from them, and to reduce the particles of these clods (excepting the potatoes) to a size small enough to fall through the belt. Another purpose, less achieved, is to facilitate the similar passage of any stems and leafy material through to the ground.

A common form of vibrator is a simple elliptical sprocket, caused to rotate by the cross-rods of the conveyor belt, in the manner of a rack in toothed engagement with a gear. Each vibrator has a suitable bearing and rotates on a supporting shaft fixed to the harvester framework. Rotation of the vibrator causes the belt to vibrate perpendicularly to the belt surface with an amplitude equal to the difference between the major and minor radii of the pitch ellipse. With the vibrator shaft in the middle of the ellipse, there are two vibrations per rotation. The usual practice is to space two or more vibrators along each side of the belt.

To avoid brushing potatoes, vibration of the belt cannot be increased indefinitely in an effort to bring about complete disintegration of all clods. The usual means of adjusting the amount of vibration to suit conditions is the simple and obvious one of regulating the belt's linear speed. Clearly, this determines the r.p.m. of the vibrators and consequently the amount of vibration given to the belt. The vibrators have the additional function of supporting the belt along its length. Where the belt must be supported without vibration, use is made of either circular rollers without teeth or sprockets with circular pitch lines. Independently driven vibrators may be used.

No amount of vibration can reduce the size of the stones, and occasionally the clods of dirt are so tightly integrated as to require for their disintegration an amount of vibration that would certainly bruise the potatoes into unmarketable condition. For these reasons the product of the harvesters thus far described is a conglomeration of potatoes with stones and clods, all in potato-size particles, unless the greatly over-size particles have been screened out. Accordingly, as now constructed, these harvesters dispose of the product at the end of the conveyor belt by one of the following: (1) the mixture of potatoes, stones, and clods may be returned to the ground, where stooped laborers pick out the potatoes for transportation to the packing shed, and (2) the load of the vibrating belt is passed along to a picking belt on the harvester. Laborers standing along this belt remove the stones and clods which are returned to the ground. From the picking belt the potatoes are usually discharged into an accompanying truck that moves along with the harvester until full, when it goes to the packing shed and its place is taken by another truck. Eight or more pickers may be used on a harvester.

In the packing shed the removal of stones and dirt is largely mechanical, using water in flumes and tanks. Effective as this is, the massive equipment and great quantities of water required make such treatment economically impossible for use on a harvester. Obviously, other means must be used for any field separation, if it is to be an improvement over the present practice based on difference in friability.

Figure 2:
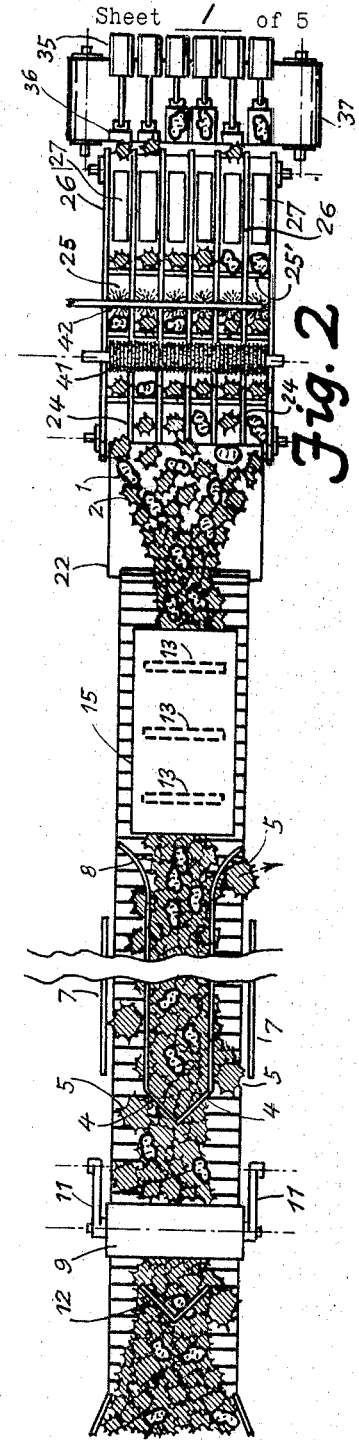
FIG. 2 is a plan view of the arrangement shown in FIG. 1.

Referring to the drawings and particularly to FIGS. 1 and 2, in accordance with usual practice, potatoes 1 and clods 2, as received from the plow or scoop of the harvester, not shown, are carried along on conveyor belt 3 of articulated cross-bars or the like, having mesh such that anything below commercial potato size drops through to the ground. Such conveyor comprises part of guide means by which a conglomerate mixture of crop product material and undesired waste objects and material are moved and guided along a substantially predetermined path or series of parallel paths to suitable conditioning mechanism described hereinafter.

An angle guide 4 is rigidly secured to the harvester framework so that it is above belt 3 at a distance slightly more than the maximum potato dimension, whatever this may be, as determined by the kind of potatoes and the nature of the soil, particularly as it exists in clods handled by the harvester. Angle guide 4 is preferably of round steel bar stock and may be covered suitably with cushioning rubber or other elastomer. In plan, with respect to the rearward direction of belt 3, angle guide 4 slopes from the center of belt 3 rearwardly toward both edges of belt 3. While potatoes 1, with stones and dirt clods 2 of potato size, all pass under angle guide 4, any larger stones and clods 5 meet the interference of angle guide 4. Then, due to the action of belt 3 on such large clods 5, and the resulting action of clods 5 against the rearwardly sloping angle guide 4, clods 5 either disintegrate and pass rearwardly under angle guide 4, or they roll outward toward one or the other edges of belt 3 where, beyond the end of angle guide 4, they are free to move rearwardly with belt 3.

In its position at the side of belt 3, such a large clod 5 is immediately exposed to direct and maximum disintegrating action of vibrators 6, instead of the indirect and less effective action of said vibrators on material in the springy central part of belt 3. This prompt removal of large heavy clods 5 to the supported sides of belt 3 conserves effort and saves the belt 3 from costly, useless damage, in addition to accelerating the desired disintegration of clods. Outside guides 7 prevent oversize clods 5 from falling off belt 3 while they are being carried along at the side of belt 3. Each inner guide 8, extending rearward from angle guide 4, is parallel to outside guide 7 and prevents oversize clod 5 from moving toward the middle of belt 3, until either (1) it is disintegrated to sizes small enough to pass under guide 8 or falls through belt 3, or (2) being still oversize when it reaches the end of outside guide 7, it will be pushed over the side of belt 3 by the outwardly curved end of inner guide 8 and fall to the ground.

Figure 3:
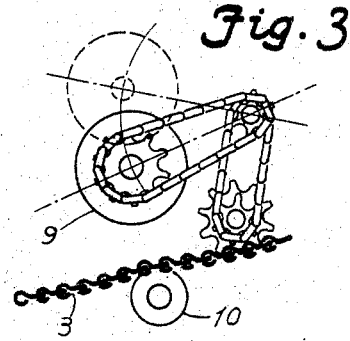
FIG. 3 is a fragmentary illustration of mechanism for driving the clod breaking roller included in the mechanism illustrated in FIGS. 1 and 2.
Figure 4:
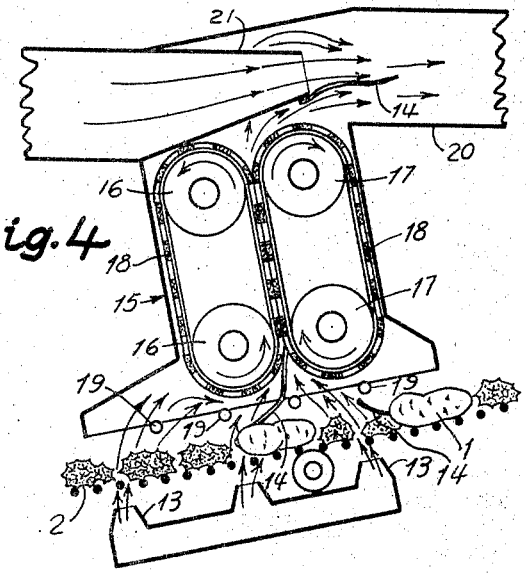
FIG. 4 is a fragmentary vertical cross-sectional view showing essentials of the vine remover mechanism included in the mechanism shown in FIGS. 1 and 2.
Figure 5:
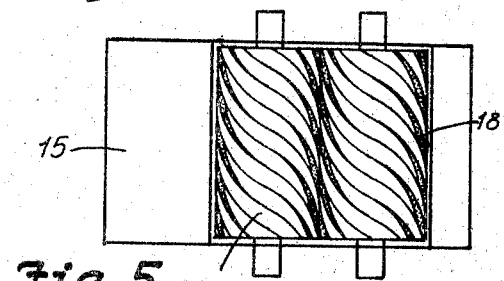
FIG. 5 is a bottom plan view of the preferred configuration of the vine remover belts shown in FIG. 4 which permit incoming air to draw vines into the contacting belts which grip and remove them.

To assist further in breaking up oversize clods 5, as well as to aid in leveling the material into a more even layer, at least under certain conditions, it is useful to add to the mechanism a clod breaking roller 9. Roller 9 is of suitable diameter and weight, preferably has a slightly corrugated surface, and may be power driven through chains and sprockets from belt 3 as illustrated by FIG. 3, or by other power. As indicated, roller 9 is free to float up and down on the radius of arm 11, taking positions depending on the bulk of material under it on belt 3; but the lower limit of its floating action preferably is such that it bears only on particles above desired potato size. Another roller 10 may be located upon a fixed axis below belt 3 to support the latter against action due to roller 9 and thus make the latter more effective. An additional angle guide 12, similar to angle guide 4, also may be placed in advance of roller 9 as indicated in FIG. 1, for lateral distribution of the belt's load of material so as to further improve the leveling effectiveness of roller 9.

If potato vines, stems, and leafy material have been sufficiently removed, then the judicious employment of the devices described hereinafter will result in particles coming off the delivery end of belt 3, in a mixture of potatoes, stones, and clods, each of which is within the size limits of potatoes. Some of these particles will be potatoes broken out of large dirt clods that otherwise would have been discarded without disintegration and with some loss of potatoes. Additionally, there will be some assurance that oversize clods that were discarded in the process of using these devices most likely were of a kind uneconomical to disintegrate. Moreover, as has been mentioned, the details of this process which bring about the treatment of the large clods at the sides instead of the center of belt 3 not only increases potato recovery but also reduces belt maintenance costs.

The mixture of particles on belt 3 commonly includes stems and vine material 14, removed by the exemplary vine remover 15 shown diagrammatically in FIGS. 1, 2, 4 and 5. In this, air is supplied in sufficient volume, pressure, and velocity, blown upward from ducts 13 through belt 3 and the spaces between particles carried by it as they are jostled about by the normal action of belt 3. This blast of air, combined with a partial vacuum within housing of vine remover 15, causes vine material 14 to stream out upwardly toward rollers 16 and 17 upon which belts 18 are carried. Rollers 16 and 17 turn in opposite directions so that the two mutually contacting parts of belts 18, after drawing together at the bottom of the housing of remover 15, move upward together toward the top of said housing.

Belts 18 are flexible material such as rubberized fabric. To the face of this material, diagonal strips are molded or fixed at intervals across the belt surface, with open spaces between them. These strips on the two belts grip stems 14, while the spaces provide for passage of air necessary to bring about said aforementioned gripping and the subsequent disposal of these stems 14. Preferably, these strips are of material more resilient than the belt base material. For example, a thin and flexible surface of durable rubber may be separated from and held to the base material by a thickness of sponge rubber. Preferably, the strips on both belts have the same lay, i.e., the angular direction with respect to the belt length. This causes the contacting strips of one belt to lie diagonally across those of the other belt, with actual contact between the belts confined to numerous diamond or lozenge shaped areas.

At any instant along the line where the belts are rolling into contact with one another, the width of the belts is divided successively into these contact areas and the adjacent channels. At the next instant, the positions of contact areas and channels are interchanged along this line, this interchange being rapidly repeated while the belts move. Thus the actions of induction, due to the rush of air and the gripping by the contact areas, are virtually constant across the entire belt width. To this end, it is preferable that the strips and the intervening spaces on belts 18 be of the same width. The action of the associated partial vacuum and moving belts of this description is such that, no matter where a stem 14 of sufficient length may protrude upward from the material carried by belt 3, it will be caught and drawn upward for disposal.

To prevent stems 14 from drawing attached potatoes into belts 18, and to ensure against bruising these potatoes in breaking stems 14 from them, guard rods 19, suitably spaced and extending across the mouth at the bottom of housing 15, are provided. These guard rods 19 are preferably of round steel covered with rubber or other resilient material to prevent bruising the potatoes. The lower extent of housing 15 with guard rods 19 is at a distance of maximum potato dimension above belt 3. At the upper end of housing 15, belts 18 draw apart as they turn over on upper rollers 16 and 17. This releases stems 14 so they are drawn into duct 20 due to the partial vacuum induced by the air blast entering from nozzle 21. Duct 20 is preferably arranged to discharge from the side of the harvester onto the ground.

The size-classified but otherwise will unseparated conglomeration of desired and waste particles reaches the end of belt 3 concentrated near the center of the belt's width. As will become apparent, subsequent automatic individual inspection of particles and selective removal of desired crop product, such as potatoes, from this conglomeration requires spreading this mass uniformly and rather thinly and reasonably evenly over a width greater than it had on belt 3. This is accomplished by additional conditioning means comprising a suitable feeder somewhat like those used in ore-dressing practice. The mass of particles falling from the end of belt 3 is fanned out by such a feeder 22 which, for example, may comprise a conveyor belt beneath a series of outwardly diverging ribs and channels thereon, either movable or stationary. Spreading to increase separation between particles when discharged onto belt 23, is accomplished by driving this belt at a speed sufficient to bring this about.

As the particles drop from feeder 22 onto belt 23, they are led by path-defining guides 24 into the spaces 25 between longitudinal ribs 26 which are integral with belt 23 and comprise additional means to guide the material along predetermined, parallel paths. Essentially, however, it is the belt of feeder 22 and belt 23 per se which are the primary means which define the predetermined paths for the material being processed. Along the length of belt 23, the spaces 25 are bridged transversely by cross-flights 25' at regular intervals. Particles on belt 23 catch against them, thus ensuring their continuous movement with belt 23.

Above each path such as are formed by spaces 25, near the terminal end of the upper course of belt 23, is one of a plurality of possible types of sensing unit or sensor control unit 27. The particular unit shown in FIG. 6 preferably is counterpoised and hingedly supported so that it is held in floating suspension whereby, within potato size limits, it is free to move up and down under action of particles drawn under it by flights 25', while at the same time it is secured against longitudinal or transverse dislocation. As will be clear from later discussion, it is preferable that the counterpoise provide for a constant downward pressure by sensor 27, within close limits, making use of a negator spring 27' or other equivalent means.

The forward or upstream end 28 of sensor unit 27 slopes upward to permit particles to enter beneath it and cause it to rise against its weight sufficiently for their complete passage under and in contact with unit 27. Sensor unit 27 is responsive to certain physical characteristics in particles drawn across its surface. Among potatoes, stones, and clods of dirt, the scraping and sliding sounds, due to their different physical characteristics is sufficiently different that when, for example, a potato contacts the sensor plate 29 the resulting sound will trigger the opening of a gate, for example. This causes separation of potatoes from the rest of the particles in the conglomeration, as will be explained in greater detail later.

For the purpose of clear understanding, a brief digression is made to point out some physical factors which such sensors usefully take into account. First, the surface of a potato is considerably different from that of either a stone or a clod of dirt. Clods and stones are almost invariably rough and gritty. In contrast with a stone or other part of the soil including what becomes a clod, the potato is a living thing of yieldable vegetable matter, and so, to the instant when it is dislodged from the soil, the growth of its surface results in it moving in every direction against the surrounding soil. Apparently for this reason, only moderate vibration usually dislodges it from the soil matrix, with a surface nearly free of dirt. On the other hand, a stone even in the form of a basically smooth pebble is inert and natively a part of the soil. When broken from it, it is more likely to be covered with soil particles that give it in effect a rough surface more comparable with that of a dirt clod which is gritty throughout.

The smooth surface of a potato is further distinguished by the fact that it is to a degree supported by cellular vegetable matter. This is in marked contrast to a stone or clod of dirt that resists disintegration. Clods are unyielding, more like hard concrete. It is largely for these reasons that the noise response (the sound that results) when a potato is drawn across a surface of thin sheet metal is greatly different from that of a stone or clod.

As to the distinction in the case of potatoes compared with stones or clods, the difference in sound response is significant, in both kind and amount, for a given effort. To describe briefly the difference is difficult, but an habitually observant person may form an adequate conception of it if he has heard the loud clatter of broken coal or stone sliding down a metal chute, and also has noticed the comparatively low, muffled sound of potatoes being dumped from a sack. It is not difficult for such a person to imagine the amount and kind of sound potatoes would make in sliding down such a chute, and how they would differ in these respects from harder and rougher materials, like stones or clods, on that same chute as well as on any other surface of thin, hard metal.

Apart from those considerations about the physics of sound, there are some other physical facts more generally thought about, having to do with the friction of different materials in sliding contact, that are taken into account in this invention. It is particularly noteworthy that when a given first material slides against a second material, the coefficient of a different third material sliding against that same first material. Moreover, in each case the coefficient is distinctly characteristic. Within narrow limits it will be the same for other samples of the same two materials in sliding contact, and this narrow range holds true for the same combination of materials, in spite of considerable variation (a) in actual areas of contact, and (b) in velocity of the one material across the other. This is shown by the following coefficients of friction determined by particles moving in contact with an iron plate having a surface finish of 63 to 125 microinches r.m.s., where there was considerable variation in velocity and in contact areas:

| Material: | Coefficient of friction |
| --- | --- |
| Potatoes | 0.43–0.50 |
| Clods | 0.30–0.39 |
| Stones | 0.18–0.20 |

The coefficient of friction is defined as the ratio $F/W$, where $F$ is the force required to move one surface over another and $W$ is the force pressing the surfaces together. The coefficient is unique for different combinations of materials. One usually thinks of finding the coefficients of friction of different materials in contact with a certain single material by using that single material as a support for the others. By pulling over it, successively, pieces of the materials being tested, whatever their individual weights, one can determine the coefficient $k$ in each case by dividing $W$ into $F$ as the formula requires. But if the arrangement is reversed and the certain single material against which the others are successively rubbed, bears downward at constant weight during the relative movement in every case, then the force $F$ is in direct proportion to the coefficient, regardless of the weight $W$ of the underlying sample being tested. This is to say, in the comparison of their coefficients of friction, $W$ cancels out as unit, and the formula reduces to $k=F$. Taking this into account simplifies and expedites testing samples in quantity. Reverting now to the examples of friction coefficients tabulated above, if a sensor be set to indicate when a coefficient of say, 0.40 is exceeded, this indication may be used to trigger the separation of potatoes from other non-crop particles described above when run under the sensor.

In this discussion directed toward physical factors pertinent to this invention, note must be made that, in addition to sound and friction, still other physical characteristics may be used to distinguish between potatoes and clods or stones, for example. The invention is not to be limited to the use of either sound or friction alone, or of both sound and friction in series, exclusively of other physical characteristics. Other physical properties may be used as a basis for actuating sensor control means which are described in detail hereinafter. What the invention comprises essentially, however, is (1) the reduction of the potato containing soil to a partly classified product which is a conglomeration of particles each of which is within certain limits of potato size, followed by (2) the separation of these particles so that each may be individually inspected, and (3) the individual examination of each particle by means of a sensor control unit which is particularly sensitive to some physical characteristic such as sound or friction, color, light reflection, hardness, electrical resistance, or any other physical characteristics the measure of which is distinctly different, respectively, in potatoes and stones or clods, sufficiently to be detected by the sensitive sensor control unit which then automatically serves to initiate (4) operation of a separating means such as a gate or otherwise to separate potatoes from the other particles.

Reverting to sensor control unit 27, entering surface 28 is preferably made of rather durable abrasion resistant metal backed up by sound absorbant material such as foam rubber 28′. Sensing plate 29 is preferably made of thin, hard, wear-resistant sheet metal with high modulous of elasticity as this assists in obtaining distinctive loud sound response. Suitable means may be used for making plate 29 quickly replaceable, as suggested in FIG. 6, by making it quickly detachable. A sensitive microphone button 31 or other sound sensitive device is suitably placed and secured for maximum effect of sound vibrations in sensing plate 29.

Figure 8:
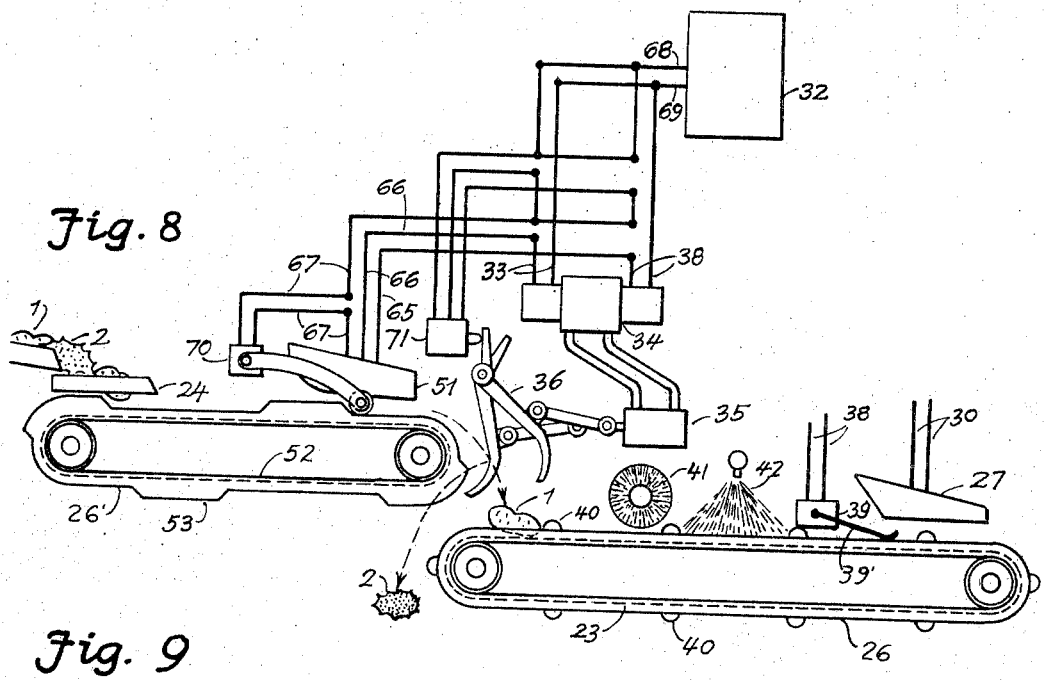
FIG. 8 is a diagrammatic side elevation, with exemplary electrical wiring diagram, showing an application to a harvester of a friction sensor control unit of this invention, together with the series application of sensor control units.

Wires 30 lead from microphone button 31 of each sensor unit 27 to a combination electronic amplifying and electrical pack, shown in FIG. 8, which shall be referred to as electrical pack 32. The contained circuits of this electrical pack 32 are not detailed as they are of kinds well known to those familiar with the arts of electricity and electronics. The feeble currents that flow in wires 30 when sound vibrations are present in sensing plate 29 may have their source in electrical pack 32 where they are then amplified and cause a relay to close a separate circuit. This separate circuit is then also supplied with current by electrical pack 32 and, in solenoid wires 33, makes this stronger current available whenever the sound in sensing plate 29 reaches a certain level. In ways also well known to those familiar with the art, each electronic amplifying circuit in electrical pack 32 may include provision for electronically filtering out impertinent and confusing noise vibrations, thereby increasing the useful sensitivity of the device.

The closing solenoid circuit wires 33 of each sensing unit 27 are connected to the closing solenoid of a double solenoid four-way valve 34 so that the latter will open and release fluid, preferably air, to actuate cylinder 35. This causes hinged gate 36, located beyond the end of belt 23 and in line with its related space and cross-flight 25′, to move to a closed position in which any particle coming off the end of belt 23 is prevented from passing to transverse belt 37 but instead is deflected and caused to fall to the ground as indicated in FIG. 1. When the opening solenoid of valve 34 is energized, gate 36 is opened or withdrawn to a position that permits the particle to land on transverse belt 37.

As with the other circuits, current for energizing this opening solenoid valve 34 is furnished by electrical pack 32. It is carried through opening solenoid wires 38 in a circuit that is closed by actuating a normally open limit switch 39. This limit switch 39 is actuated by a cam 40 projecting from and integral with rib 26 of belt 23. Along each rib 26 there is one of these cams 40 for each cross-flight 25′. In FIGS. 1 and 8, it will be seen that the actuating lever 39′ of limit switch 39, in relation to cam 40, has a form so that current flows in opening solenoid wires 38 during time sufficient to open gate 36 before a particle reaches sensing plate 29. Only when a stone or clod 2 passes under sensing plate 29 is the sound enough to trigger the energizing of the closing solenoid of valve 34 and the consequent closing of gate 36 that causes such stone or clod 2 to be discharged to the ground. For proper timing, the positions of both sensing units 27 and limit switches 39 are preferably made independently adjustable along the line of belt 23.

Summarizing, the action of this part of the harvester or handling mechanism in inspecting a particle is as follows: (1) when a particle reaches sensor control unit 27 as a result of being moved along its predetermined path, gate 36 will be already open if the previous particle was a clod or stone 2, it would have closed gate 36, but switch 39 will act to open gate 36 before the particle reaches sensing plate 29, (2) following this, when the particle rubbing across sensing plate 29 is a potato, the sound is insufficient to bring about the closing of gate 36, it remains open and the potato passes to transverse belt 37, (3) but if the particle is a stone or clod, the sound is sufficient to cause gate 36 to close and it does so, which shunts it off of belt 37 and causes it to be ejected to the ground.

Upstream from sensor unit 27, there preferably is a power driven rotary brush 41, extending over the width of belt 23, which rotates in a direction so as to seat each particle on it against a cross-flight 25', and remove small grains of dirt that may cling to potatoes 1 and result in false or confused signals. Such cleaning tends to improve discriminative sensitivity of the device. Further, to improve this sensitivity, a small quantity of water, sprayed in the form of a mist 42 from a suitable nozzle and supply pipe and applied to the top of particles carried by belt 23, can be used to lubricate and further reduce the sound when potatoes 1 are in contact with sensing plate 29, but does not materially reduce the much higher sound level in the case of stones or clods 2.

The fully classified end product, comprising potatoes separated from stones and dirt, is carried by transverse belt 37 at the end of which it is discharged to an elevating belt conveyor, not shown, whence it is transferred to an accompanying truck for hauling to the packing shed.

Figure 9:
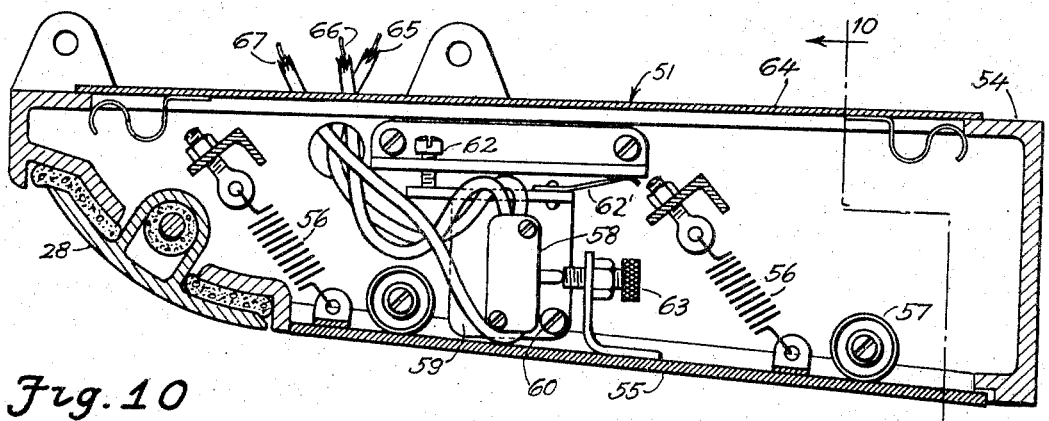
FIG. 9 is a vertical longitudinal cross-section of the friction sensor control unit shown in FIG. 8.

Under certain conditions, with particular reference to different physical characteristics, superior effectiveness of the harvester is obtained by use of the friction sensor unit shown in FIGS. 8 and 9. This friction sensor unit 51 may be secured in floating suspension as already described in regard to the sound sensor 27. Material inspected by friction sensor unit 51 is carried by belt 52. Like belt 23, this belt 52 has longitudinal spaces and cross-flights similar to spaces 25 and cross-flights 25' on belt 23 between ribs 26' thereon. Belt 52 also has cams 53 which are indicated in FIG. 8 as being longer than cams 40 of belt 23, although it is to be understood that the cams 53 on belt 52 may be of the same form as cams 40 if the lever that is moved by them is formed so as to give the same effect as the longer cams 53.

In the embodiment of FIGS. 8 and 9, the entire friction "brain" or unit, including friction sensor 51, the associated switches and wiring, belt 52, etc., may be substituted for the entire comparable sound unit and its associated parts of the embodiment of FIGS. 1-6, up to gates 36 which are common to both units. So substituted, the entire friction unit discharges to the transverse belt 37. However, both the entire friction and sound units may be used in series, as suggested in FIG. 8, wherein the entire friction unit discards part of the waste from material inspected, and passes the partly classified remainder to an entire sound unit for final classification of the product from which the potatoes then pass to the transverse belt 37. However, without restriction thereto, the conditions referred to may be met better by interchange of the units in FIG. 8, that is, by having the friction sensor unit follow instead of precede the sound sensor unit. Further, conditions may require the series arrangement of more than two entire units; and, whether there be two or more, conditions may be met better by having them all of one kind, sound or friction or otherwise, or of different kinds, depending upon the condition of the material being handled.

Apart from different physical characteristics in different regions, a factor entering into the foregoing choice of sensor units is the matter of velocity of the material being inspected, which has been referred to earlier. This is due to the need for separating the material into individual particles so that each may be adequately inspected. After transversely spreading out and feeding the material into spaces 25, over a wider space than it had on belt 3, the longitudinal separation on the inspection belt, 23 or 52, is accomplished by using a belt speed sufficient to do this. But this advancing speed may be too high to allow time for the sensor control unit to make the desired fine discrimination, whatever kind of sensor unit may be used. The speed may be such as to require setting the sensor at a lower level of discrimination, to ensure that there will be no potatoes discarded. But with this lower discrimination, some clods and stones will be included in the unit's end product. However, the entire bulk of the end product will be so much smaller than the input, the considerably lower speed in the succeeding series unit will give the required discrimination to complete the separation. That is, with this lower speed, the final sensor may be set for maximum discrimination and clean separation of all potatoes from stones and clods.

Referring to FIG. 9, the body 54 of friction sensor 51 may be provided with lugs for attaching it to common means for its floating suspension. The general form of the exterior body 54, with its upturned forward end 28, is like that of the sound sensor 27. But friction sensing plate 55 is of comparatively durable material and, within sufficient limits, is mounted for free movement longitudinally with respect to body 54. Plate 55 is held in this movable position in the bottom of body 54 by means of springs 56 in which, preferably, the tension is adjustable by common means. The length of the recess in which plate 55 is held is slightly greater than that of the plate 55, so as to limit longitudinal movement of plate 55 in body 54. Rollers 57, by means of preferably small sealed ball bearings, secured to body 54, hold plate 55 against the upward components of springs 56 while permitting it to move with minimum friction within the recess of body 54. Longitudinal components of springs 56 combine to draw plate 55 forward against the upstream end of this recess which serves as a stop, unless a rearward force, due to the friction of a rearward moving particle in contact with it, causes the plate 55 to move to the stop at the downstream end of the recess. Springs 56 are preferably placed in the downstream end of the recess. Springs 56 are preferably placed in the crosswise middle of plate 55 so as not to induce unwanted friction between plate 55 and body 54.

Depending on the difference between coefficients of friction of potatoes and of waste particles, for example, and the cut-off point wanted in the separation of these, the tension of springs 56 is adjusted so that plate 55 remains unmoved from the forward stop when waste particles are drawn across plate 55; but with the higher friction of the product to be separated from the waste particles, the resulting force is sufficient to draw plate 55 to the downstream stop in body 54. To signal whether one or the other of these kinds of particles is being inspected, use is made of a two-circuit limit switch 58, one of these circuits being normally open, the other normally closed, and the condition is interchanged in each of them when the switch is actuated. Switch 58 is secured to plate 59 which is pivoted by screw 60 on body 54. The actuating plunger of switch 58 engages the course adjusting screw 63 in a bracket fixed to plate 55. Very fine adjustment of the position of friction sensor switch 58 relative to base plate 59 is afforded by adjustment screw 62 threadably supported by a bracket fixed to friction sensor body 54 to move switch 58 in one direction about pivot screw 60, while spring finger 62' urges the switch 58 in the opposite direction. Of the electrical leads from switch 58, wire 65 is part of the normally open circuit, wire 66 is part of the normally closed circuit, and wire 67 is common to both these circuits.

Referring to FIG. 8, the source of current may be in the electrical pack 32 through wires 68 and 69. As with sound sensor 27, double solenoid four-way valve 34 releases fluid for either the opening or the closing of gate 36 by fluid cylinder 35; wires 33 carry current to energize the closing solenoid; and wires 38 energize the opening solenoid of valve 34. One of each of these wires 33 and 38 is connected directly to wire 69. The other of each of these wires 33 and 38 is connected indirectly to wire 68, being in series with the following switches.

(1) Sensor implementing switch 70, normally, off, permits flow of current in wire 67 only during the time a particle is moving along in proper contact with plate 55; that is, switch 70 does not close until the particle has passed fully into contact with plate 55 so that if the coefficient of friction of the particle is sufficient to do so, it will have caused plate 55 to move to the downstream end stop and actuated switch 58. Also, switch 70 again opens just before the particle passes out of full contact with plate 55. Switch 70, actuated by a lever in contact with the cams 53 on belt 52, is timed to bring this about.

(2) Sensor switch 58, in series with sensor implement switch 70 just described, is therefore active only when a particle is in proper contact with plate 55 to signal whether it is a clod or a potato. In the case of a clod or stone, the friction of the particle is not enough to pull plate 55 away from the upstream stop in case 54 and actuate switch 58; wire 66 remains live. If the other switches in series with it were closed, this would complete the circuit to the closing solenoid of valve 34, and the gate would be closed by fluid cylinder 35. In the case of a potato, the friction is enough to move plate 55 sufficiently to actuate switch 58. This interchanges the condition in switch 58 and wire 65 becomes live. Then if the other series switches in this circuit of wire 65 are closed, opening solenoid of valve 34 will be energized and gate 36 will be opened.

(3) Gate switch 71, like switch 58, has two circuits; one of these is open when the other is closed, or vice versa. It is lever actuated by gate 36. Switch 71 is an implementing switch which obviates needless energizing of the solenoids in valve 34, in this way: When gate 36 is open, gate switch 71 opens the circuit of wires 38 of the opening solenoid; and when gate 36 is closed, it opens the circuit of wires 33 to the closing solenoid. All of these circuits and functions may be traced in the wiring diagram of FIG. 8.

Summarizing, the performance of this friction inspection part of the harvester or crop handling mechanism is as follows:

(1) Since switch 70 is closed only during the time each particle is in proper contact with plate 55, and is open at all other times, the open or closed position of gate 36, determined by the nature of the preceding particle, continues until a particle is in proper contact with plate 55.

(2) If a potato follows a potato, or a clod follows a clod, neither solenoid of valve 34 will act because gate switch 71 will have opened the circuit of the opening or the closing solenoid, respectively since gate 36 is already in the wanted position to retain a potato or discard a clod. Gate 36 remains in this position; the particle is so properly retained or discarded; and gate 36 then continues in this position until the next succeeding particle, in contact with plate 55, may or may not alter it. (3) If a potato follows a clod, or a clod follows a potato, the circuit through switch 71 will be already closed to permit energizing whichever solenoid of valve 34 is necessary to change gate 36 for proper disposition of the potato or clod; that is, respectively, gate 36 will open or close.

(4) When a potato is moving in proper contact with plate 55, its friction is enough to move plate 55 toward its downstream stop in body 54. This movement actuates switch 58 so that the circuit of wire 65 with wire 67 closes to energize the opening solenoid of valve 34 leading to the opening of gate 36. Implementing switch 70 in wire 67, is already closed as explained. Gate switch 71, if needed to complete the circuit for energizing the opening solenoid, will also be closed. With the circuit thus completed through the opening solenoid, gate 36 will be opened and the potato will be retained. But, if switch 71 is open, it means that gate 36 will be already open; in this case also the potato will be retained. (5) When a clod or stone is moving in proper contact with plate 55, its friction is not enough to move plate 55 from its initial stop at the upstream end of body 54. In this position switch 58 has closed the circuit leading through wires 66 and 67 to the closing solenoid of valve 34, and will remain closed during the friction contact of the clod or stone. Switch 70 in wire 67 will already be closed during this time. Also, switch 71 will be closed if the previous particle was a potato. This completes the circuit through the closing solenoid; gate 36 closes and the clod is rejected. If the previous particle was a clod, switch 71 will be open due to the closed position of gate 36, as explained, making it unnecessary to energize the closing solenoid. Gate 36 remains closed and the clod is rejected.

While the rejected particles are all routed to the ground by the friction unit, the disposition of the retained materials from it depends on whether or not it is the last inspection unit of classification. If it is, its product may be routed to the transverse belt 37. If not, its product will be routed to the next following unit for further classification as already discussed.

Figure 6:
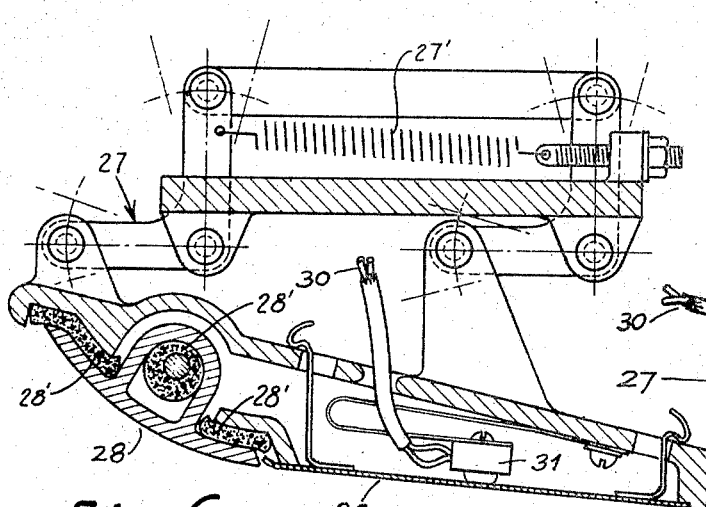
FIG. 6 is a vertical cross-section along the line 6—6 of FIG. 7, showing essentials of an exemplary sound sensor control unit shown in FIG. 1 with its wiring diagram.
Figure 7:
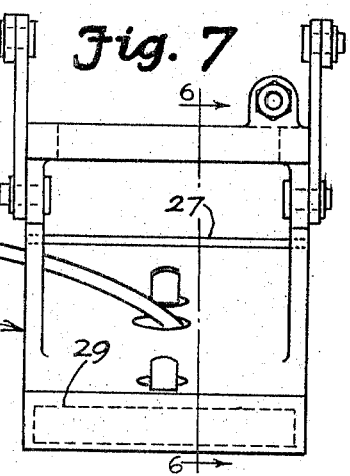
FIG. 7 is an end view of the sound sensor control unit shown in FIG. 6.
Figure 10:
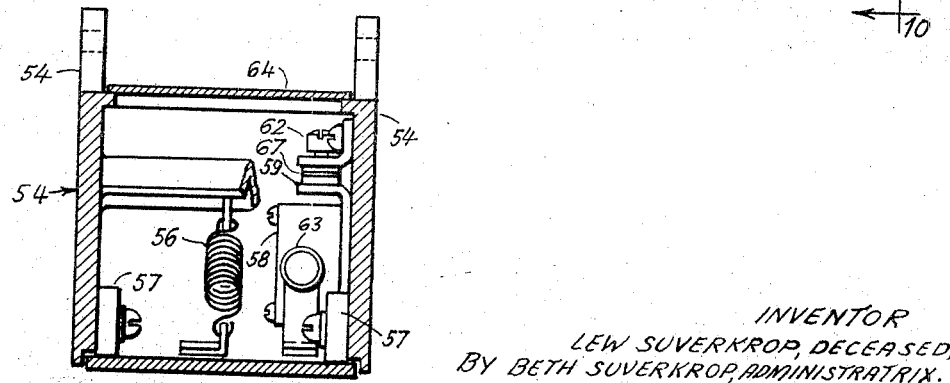
FIG. 10 is a transverse cross-sectional view, adjacent the trailing end, of the friction sensor control unit shown in FIG. 8.

In the foregoing description, reference has been made, in detail, both to sound-responsive sensors, such as shown in FIGS. 6 and 7, and friction-type sensors, such as shown in FIGS. 9 and 10. In addition to these particular, specifically described sensors, other types also are capable of being used in various embodiments of the present invention, all for the purpose of effecting the separation of desired crop products from waste material with the highest possible degree of efficiency and perfection. Reference will now be made to a number of additional types of sensors.

Figure 11:
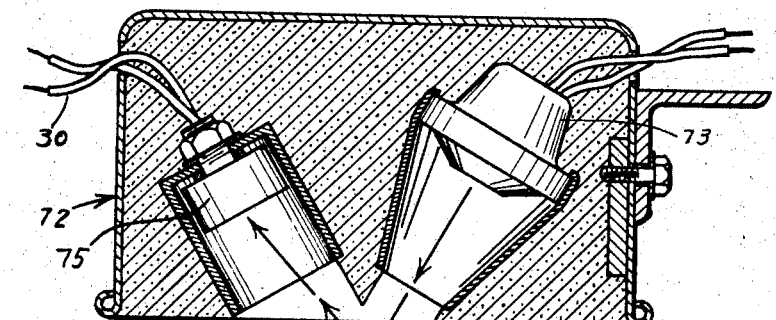
FIG. 11 is a fragmentary enlarged vertical sectional view of an exemplary sensor control unit responsive to sound echos.

Referring to FIG. 11, a different type of sound-responsive sensor is shown from that illustrated in FIGS. 6 and 7, wherein a sliding or dragging type of friction in relation to a metallic plate produces a very high pitched screech when a stone or clod of dry soil scratchingly moves past said metal plate. The sound-responsive sensor unit 72 shown in FIG. 11 however is of the type which develops its own sound by means of a small radio speaker 73, for example, which is connected to a suitable circuit of electric current and either includes a built-in timing device or an appropriate timer is included in the circuit to the speaker 73 so as to intermittently emit an appropriate sound at a desired cycle, said sound being directed toward an object 74 such as an object of material, which may be either desired crop material or waste material which is disposed upon the conveyor inspection belt 23 for movement past the sensor unit 72.

Preferably, as shown in FIG. 11, the sound is directed at an angle against the object 74 and an appropriate sound-sensitive receiver 75, suitably tuned to distinguish between certain ranges or pitches of sound, is positioned to receive sounds reflected from the object 74. The operation of this system is based upon the principle that, due to the structural rigidity of stones and clods of earth, as compared with more yielding organic material such as vegetable products, including potatoes and the like, when certain sounds are directed against the material and are reflected therefrom, less sound will be reflected from the yieldable crop objects than from the waste clods of earth and stones, for example.

Although only a single sound-responsive sensor unit 72 is illustrated in FIG. 11, the same is intended to be representative of a series thereof which, if desired, may be arranged in a row extending transversely across the path of movement of the material as conveyed past such bank of sensor units by the conveyor belt 23 for example. Under such circumstances, there would be provided at least one sensor unit 72 for each row of advancing objects, as determined by the longitudinally extending guides 24 shown in FIG. 2. Further, it is to be understood that the sensor units 72 may be used either in lieu of or in conjunction with the sensors described hereinabove, particularly with reference to certain additional systems to be described hereinafter, particularly with regard to FIGS. 14A–14C.

Figure 12:
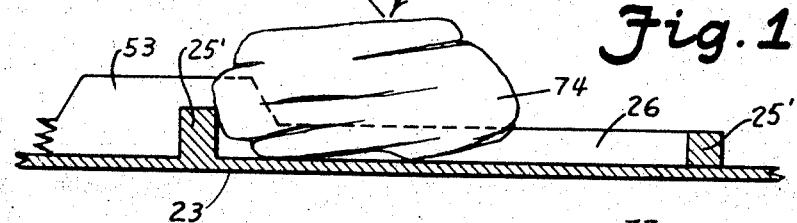
FIG. 12 is a fragmentary enlarged vertical sectional view of an exemplary sensor control unit responsive to the reflection of light from material as moved past the same.
Figure 12:
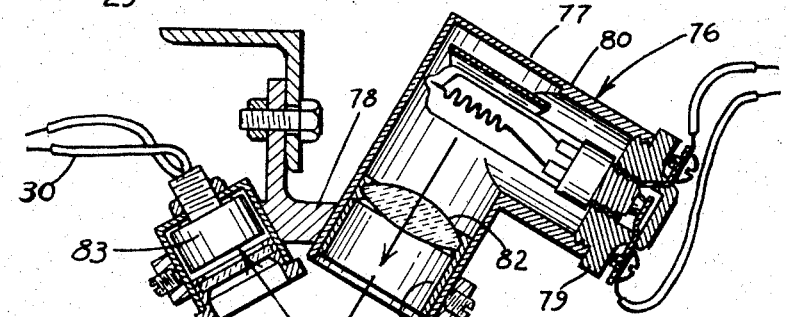

A further type of sensor unit 76 is illustrated in FIG. 12, the same being a light-responsive type sensor. This unit 76 comprises a light-projecting element 77 which includes a casing supported by a bracket 78 in fixed relationship with respect to the sensor area of the overall system shown in FIGS. 1 and 2. Said casing has angularly related sections, one of which supports a socket base 79, removably, in order to permit ready replacement of the electric light bulb 80 which is energized by an appropriate circuit connected to a source of power such as a storage battery carried by the system shown in FIGS. 1 and 2, particularly where the system is of a portable type movable over a field. Preferably, the light bulb 80 is of relatively high intensity, of the order of 250 watts for example. Without restriction thereto, said lamp may be of the iodide-quartz type which in comparison with the size thereof efficiently produces a high wattage light yield.

Also mounted removably within the casing in angular relationship to the socket 79 is a lens holder 81 which supports an appropriate lens 82. A series of such lenses preferably are provided, each of a different color or hue. In this regard, it is recognized that the color of stones and clods in different localities will vary from each other and at least a reasonable range of colored lenses should be provided with the present invention in order to adapt the sensor element 76 suitably for use in a wide range of localities.

The unit 76 also includes a light sensitive element 83, particularly one which is responsive to different colors of light. For example, if the object 74 moving past the sensor 76 upon inspection belt 23 is a potato, having a characteristic yellowish brown color, the light-sensitive element 83 is selected so as to cause no interruption to the passage of the object, whereupon it passes along to its receiving belt such as belt 37 shown in FIGS. 1 and 2 for example. However, if the object 74 is a stone which is dark gray in color for example, the light-sensitive element 83 will operate to cause the ejectors 36, for example, shown in FIGS. 1 and 2, to deflect the object from the system onto the ground. The same is true with respect to the object 74 being a clod of earth which is at least different in color from that of the potato or other crop object being harversted. To facilitate the sensitivity of the element 83 as already described above, a water mist spray 42 shown in FIG. 1, preferably is sprayed upon the objects being conveyed past the sensors so as to render the true color thereof more accurately discernible by the element 83.

By way of more specific example, the lens 82 may be selected to have a color similar to that of the desired crop product being harvested, whereby when light is passed through said lens, the crop objects will absorb said light and not reflect any visible color, whereas objects such as clods and stones, which are of a different color from the crop product, will reflect certain colors to which the element 83 is responsive for purposes of activating the ejection gates 36. To provide maximum sensitivity for element 83, the same may be of the kind commonly used in photometers which generate an electric current, usually at the interface between the copper oxide coating on copper metal, or the element 83 may be of a much more sensitive kind such as a selenium-sulfide type, the electrical resistance of which varies greatly with minute changes in visible light to which it is exposed.

It also is to be understood, as in regard to the sound-responsive sensor unit 72 shown in FIG. 11, there preferably is a transverse row of the sensor units 76 arranged transversely across the path of the rows of moving material conveyed therepast by inspection belt 23. Also, the sensor units 76 may be used in lieu of or in conjunction with other types of sensor units in accordance with arrangements described hereinafter with regard to FIGS. 14A–14C.

Figure 13:
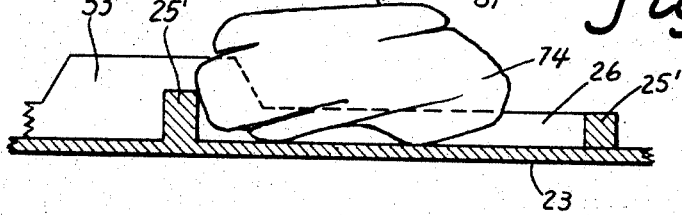
FIG. 13 is a fragmentary enlarged vertical sectional elevation of an exemplary sensor control unit responsive to radiant energy transmitted through the material as moved past the same.
Figure 13:
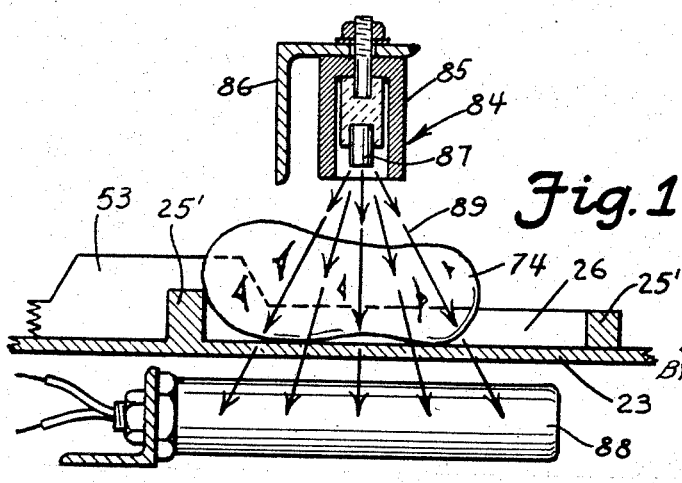

Still another type of sensor is illustrated in FIG. 13, wherein a radiant energy type sensor unit 84 is shown. As in regard to the other types of sensor units illustrated in the preceding figures and described hereinabove, there preferably will be one of each of these units mounted stationarily in the sensor area of the entire system shown in FIGS. 1 and 2, for example, and said unit may either be used in lieu of or in conjunction with said other types of sensor units, particularly as described hereinafter with regard to the modified arrangements illustrated in FIGS. 14A–14C.

Referring to FIG. 13 in detail, it will be seen that, preferably within a lead shield 85, supported by a fixed bracket 86, is an exemplary radiant energy-emitting unit or cell 87 of any appropriate strength or type and preferably one which is permitted for use in systems such as that herein being described.

Mounted directly below the inspection belt 23 is an appropriate Geiger tube 88 or other appropriate device sensitive to radiant energy. Under the circumstances, also, the material from which the inspection belt 23 is formed is selected so as to provide minimum blockage of passage of the radiant energy. In using a unit of this type for inspection purposes to distinguish between desirable crop products and unwanted waste material, crop products are very transparent as far as radiant energy is concerned, whereas waste material such as clods and stones are not.

In the exemplary illustration of FIG. 3, it will be seen that the object 47 is shaped to represent a potato and the energy rays 89 are illustrated as passing readily therethrough to the sensitive Geiger tube 88. It is appropriate to mention that, in lieu of the radiant energy unit or cell 87, an X-ray unit may be used, especially in view of the fact that X-rays pass through crop products with no difficulty, whereas clods of earth and stones offer very substantial obstruction to the passage of X-rays therethrough. Under such circumstances, element 88 would not be a Geiger tube but, rather, would be an appropriate element responsive to X-rays and upon failing to receive X-rays, at least in appropriate volume, would trigger movement of the ejecting gates 36 to ejecting position, as when clods and stones are passing the sensor unit 84.

In regard to all of the different sensor units respectively shown in FIGS. 11–13, the following are in common: (1) the inspection belt 23 with the cross-flights 25' for purposes of insuring the movement of the material positively toward and past the sensor unit, (2) the ribs 26 which extend longitudinally along the belt 23 for purposes of insuring the passage of the material in rows in substantially definite parallel paths arranged in side-by-side relationship, as well as the cams 53 which project upwardly from the ribs 26 for purposes of actuating the limit switches 39 by engaging the cam arms 40 associated therewith if no other form of timing means is used, and (3) the wires 30 connected respectively to the sound receiver 75 in FIG. 11 and the light-sensitive element 83 in FIG. 12 are each the same as the wires 30 of the wiring diagram in FIG. 1 and function thereof described hereinabove with respect to said diagram. Hence, particularly in regard to the sensor shown in FIGS. 11 and 12, the sound and light respectively emitted by the speaker 73 and light bulb 80 are periodic in nature but preferably at a relatively frequent cycle.

For maximum efficiency in automatically segregating and separating desired crop products from waste material such as clods, stones, soil and vines, not only is passage of the material in substantially predetermined paths past sensors desirable, but, in addition, passage of said material either past or beneath a series of successive sensors is preferable. Such series of sensors acting upon the material moving along any such predetermined path may be either of the same type of sensitivity, such as friction, sound, light, radiant energy, or otherwise, or successive sensors may be responsive respectively to different physical characteristics of the material.

Increase in efficiency obviously is possible from the inherent basic fact that as each sensor acting upon the row of material moving along any predetermined path ejects waste material from the overall volume of material moving along said path, the next sensor in order of movement of the material may be adjusted or set to have either a higher degree of sensitivity or, preferably, the material may be moved past such successive sensors respectively at slower and still slower rates so as to enable the sensors to be more accurate in their selectivity, all for the purpose of insuring as far as possible that no desired crop products are ejected, even at the expense of retaining more than might be desired of the waste material as the mixtures of material progressively are moved past the successive sensors.

By way of more detailed discussion of this aspect of the invention, and particularly considering the aspect that the sensitivity of the various sensors may be adjusted, it is the principal object of the present invention to assure that substantially no desired crop products are discharged onto the ground for example except possibly those rather unusual situations where a crop object such as a potato is completely encased in a clod and that clod has not been disintegrated by the preliminary equipment provided in the conditioning area of the harvesting and treating system embodied in the present invention. The initial sensor, for example, regardless of the physical characteristic to which it is sensitive, also is adjusted to a lower degree of precision with respect to ejecting waste material than the successive sensors. Under average conditions however, by way of example, this initial sensor may be set in its degree of sensitivity so as to insure that no crop materials are discharged, while nevertheless insuring that, for example, substantially all of the stones and possibly as high as about 85% of the clods are discharged. Obviously, this represents a tremendous segregation of wanted from unwanted material, notwithstanding the fact that possibly as much as 15% of unwanted waste material is still included with the wanted crop product.

Further, the physical characteristic to which this initial sensor in each row of multiple sensors is sensitive may be varied from locality to locality, depending upon the nature of the soil in which the particular crop product of that locality is being grown. It is preferred that such initial sensor be of a type which is capable to provide for the discarding of the vast majority of the unwanted waste material during the initial passage of the entire mixture of the material past the same.

By such a substantial reduction of the waste material in the rows of material moving along to the next sensor from the first one, it is obvious either that the rate of movement may be decreased or said rows may be transversely spread, while being moved at the same initial speed, so as to permit the arrangement of successive sensors to be operable at increasing sensitivity to waste material, thereby to insure maximum retention of desired products and definitely positive ejection of the undesired waste material.

To more vividly illustrate the foregoing principles of the invention, attention is directed in FIGS. 14A–14B–14C. These figures are graphic and diagrammatic representations of exemplary possibilities of employing a succession of sensors with regard to each individual row or path of material which is advanced successively past said sensors. Appropriate legends are provided in these various figures so as to minimize the necessity for specific description thereof. Referring to FIG. 14A in particular, the basic principle intended to be illustrated therein is that each of the conveyor belts successively are operated at decreased speeds. The three sensors included in the diagrammatic representation in FIG. 14A may either be sensitive to the same physical characteristic or different characteristics of the material moving therepast.

Fundamentally, each of these sensors is adjusted to retain all of the crop product but only part of the waste material, whereby a more accurate separation of waste from crop product is obtained as the material moves past each sensor, due to an increase in exposure time or greater sensitivity of the successive sensors. With reference to the final indication of crop products at 96% potatoes, the intended principle to be illustrated by this diagrammatic arrangement is that it is better to have less than 100% crop products with a very minor percentage of waste material therein than to lose even a very small or relatively infinitesimal percentage of the crop product during the inspection and segregation operation of the harvester system.

Referring to FIG. 14B, it will be seen that a somewhat simpler arrangement is provided than FIG. 14A, in that only two conveyor belts and two sensors are provided. The conditions under which these various harvester arrangements are used preferably should be selected in accordance with the character of the soil in which harvesting is being undertaken. For example, if there is a relatively small percentage of stone but a fairly high percentage of clods, especially if the soil is inclined to be dry, with reference to the illustration of FIG. 14B, the first sensor is preferably selected to be of the type responsive to clods, either by sound, color, radiant energy, friction, or otherwise, and thereby render said sensor capable of discarding the vast majority of clods while passing, preferably and ideally, 100% of desired product, but including a minor percentage of stones for example. Then, belt No. 2 may be moved at a much slower speed for example than belt No. 1, and sensor No. 2 is selected so as to be capable of discharging preferably all of the stones from the desired crop product, thereby depending upon the nature of the stones with respect to color, composition, or otherwise, and appropriately selecting the most efficient type of sensor of those described hereinabove to effect such separation of stones from the desired crop product such as potatoes. Under such circumstances, it is to be anticipated that approximately 100% of crop products with, at most, an infinitesimal percentage of waste material will result from this type of classification and separation.

In the exemplary arrangement shown in FIG. 14C, it will be seen that, as distinguished from the preceding arrangement shown in FIGS. 14A and 14B, wherein only a single product belt is provided, two product belts are provided in the exemplary diagrammatic layout shown in FIG. 14C. This permits a much more efficient separation of waste material from desired crop products than in the preceding figures for the following reasons.

The first two successive belts and the first two successive sensors in FIG. 14C could, at least under most circumstances, be substantially the same as the arrangement shown in FIG. 14B. However, by providing belt No. 3, and discharging the rejected material from belt No. 2 thereonto, particularly the clods and crop product could be reworked while moving along belt 3 which, as distinguished from the arrangement in FIG. 14A, could move at a far slower speed than that of belt 3 in FIG. 14A, while providing an appropriate sensor No. 3, depending upon local soil conditions, weather conditions such as dryness, etc., whereby it will be seen that belt No. 3 and sensor No. 3, for practical purposes, functions somewhat as a scavenger to insure that substantially no desired crop products are discarded, especially where they might be included in clods of soil, etc., the final result being that a second product belt receives the crop products salvaged from the operation of sensor No. 3 while separated clods are discarded to the ground.

While the invention has been described and illustrated in its several preferred embodiments, it should be understood that the invention is not to be limited to the precise details herein illustrated and described since the same may be carried out in other ways falling within the scope of the invention as claimed.

What is claimed is:

1. Crop handling mechanism operable to receive a mixture of crop material and undesired waste objects and material mixed therewith and having different physical characteristics than said product material and separate said crop product material from said undesired waste objects and material in said mixture, said handling mechanism comprising in combination, guide means to direct the movement of a mixture of desired crop product material and undesired material along a predetermined and substantially fixed path, means disposed adjacent said guide means and operable above the same to engage and remove from said guide means material larger than a predetermined size to be processed by said mechanism, separating means movable relative to said guide means and operable to change the direction of movement of one of said materials to separate it from the other material, and sensor control means positioned adjacent said path and responsive to at least one physical characteristic of one of said materials when moved past said sensor control means and operable selectively to actuate said separating means in response to differences respectively in the reaction of said physical characteristic of said desired crop material and undesired objects and materials relative to said sensor control means to cause said separating means to function to separate said desired crop product materials from said undesired objects or materials.

2. The crop handling mechanism according to claim 1 in which said guide means comprises conveyor means upon which a mixture of said material is supported and moved thereby in a predetermined path past said sensor means, and said crop handling mechanism also including power means connected to said conveyor means and operable to drive the same at a desired speed commensurate with the sensitivity of said sensor control means to distinguish between desired crop material and undesired waste material and objects.

3. The crop handling mechanism according to claim 2 further including material conditioning means adjacent said conveyor means and operable to engage the mixture of desired and undesired material thereon and arrange the same to facilitate the operation of the sensor control means to distinguish between desired crop material and waste material and objects.

4. The crop handling mechanism according to claim 3 in which said conditioning means comprises means to level the mixture of material into a layer of substantially uniform thickness upon said conveyor means.

5. The crop handling mechanism according to claim 4 in which said conditioning means also includes removal means above said conveyor means and operable to engage waste vegetable material from said mixture of material and remove it from said layer thereof to faciltate the effectiveness of said sensor control means.

6. The crop handling mechanism according to claim 5 in which said removal means comprises friction belt means arranged to move upward from said conveyor means, and blower means operable to direct the waste material from said conveyor means toward said removal means.

7. The crop handling mechanism according to claim 2 further including channelizing means adjacent said conveyor means and operable to divide the layer of mixed material upan said conveyor means into predetermined parallel rows directed beneath said sensor control means.

8. The crop handling mechanism according to claim 2 in which said sensor control means is above said conveyor means and said separating means comprise by-passing means movable relative to said conveyor means and operable in response to a reaction of said sensor control means relative to one type of material moving past the same to move said by-passing means into position relative to the moving material to deflect the same from said conveyor means.

9. The crop handling mechanism according to claim 8 further including means to receive the desired crop material when said by-passing means has functioned to separate the same from said waste material and objects.

10. The crop handling mechanism according to claim 9 in which said by-passing means comprise deflecting gates movable relative to said conveyor means and operable as actuated by said sensor control means to deflect waste material and objects from said conveyor means and permit passage of desired crop material to said receiving means therefor.

11. The crop handling mechanism according to claim 10 in which said conveyor means and receiving means are spaced and said gates are movable relative to the space between said conveyor means and said crop receiving means.

12. The crop handling mechanism according to claim 1 in which said sensor control means comprises a plurality of sensor control means respectively responsive to different physical characteristics of components of said mixture of material, said plurality of sensor control means being arranged successively relative to said conveyor means, whereby material moved by said conveyor means is subjected individually in succession to said sensor control means, and said sensor control means respectively activating said separating means and thereby assuring maximum separation of waste material and objects from desired crop material.

13. The crop handling mechanism according to claim 12 in which said conveyor means also includes a series of movable conveyors arranged respectively to carry the material along predetermined paths past one of said sensor control means and move it to the next succeeding conveyor.

14. The crop handling mechanism according to claim 13 in which said separating means comprise deflector members respectively adjacent each conveyor nd operable for movement between several positions relative to said conveyors to deflect waste material and objects from said conveyors when in one position and permit desired crop material to pass to the next succeeding conveyor when said deflector members are in another of said positions.

15. The crop handling mechanism according to claim 14 in which said conveyors are successively at lower levels and respectively receive desired crop material and any retained waste material and objects from the preceding conveyor.

16. The crop handling mechanism according to claim 1 further including electrically operated actuating means interconnected to said separating means and operable to actuate the same, and means interconnected to said sensor control means and actuating means to cause actuation of said actuating means by a reaction of said sensor control means to material moving past the same.

17. The crop handling mechanism according to claim 16 further including sound generating means in said system activated by the movement of material along said predetermined path thereof, and said sensor control means being responsive to certain sounds produced by said generating means and operable to actuate said separating means in response to said certain sounds.

18. The crop handling mechanism according to claim 16 further including a source of light in said mechanism directed onto said material while moving along said predetermined path thereof, and said sensor control means being responsive to differences in light reflected from said moving material and operable to actuate said separating means in response to said differences in reflected light.

19. The crop handling mechanism according to claim 16 further including a source of radiant energy in said mechanism directed onto said material as moved along said predetermined path thereof, and said sensor control means being responsive to differences in the radiant energy passing through said material and operable to actuate said separating means in response to said differences in the radiant energy passed through said material.

20. The crop handling mechanism according to claim 16 in which said sensor control means is responsive to friction and has means thereon movable in response to frictional engagement therewith by material moving in contact therewith and is operable to actuate said separating means when frictional engagement by certain materials moves said movable means a predetermined amount.

References Cited

UNITED STATES PATENTS

| | | | |
|---|---|---|---|
| 2,980,229 | 4/1961 | Carter | 198—31 |
| 3,052,353 | 9/1962 | Pritchett | 209—111.7 X |
| 3,070,227 | 12/1962 | Larew et al. | 209—75 |
| 3,137,392 | 6/1964 | Slight | 209—111.7 |
| 3,209,910 | 10/1965 | Palmer et al. | 209—74 |
| 3,351,198 | 11/1967 | Wyman | 207—111.7 X |
| 3,355,980 | 12/1967 | Mathias | 209—111.7 X |

FOREIGN PATENTS 1,227,518  8/1960  France.

ALLEN N. KNOWLES, *Primary Examiner.*

U.S. Cl. X.R.

209—74, 75, 111.5, 111.7, 111.9, 90